United States Patent [19]

Bernauer et al.

[11] 4,385,726
[45] May 31, 1983

[54] METHOD OF PREHEATING MOTOR VEHICLES WITH INTERNAL COMBUSTION ENGINES

[75] Inventors: Otto Bernauer, Weinstadt; Helmut Buchner, Wendlingen, both of Fed. Rep. of Germany

[73] Assignee: Daimler-Benz Aktiengesellschaft, Stuttgart, Fed. Rep. of Germany

[21] Appl. No.: 150,291

[22] Filed: May 16, 1980

[30] Foreign Application Priority Data

May 26, 1979 [DE] Fed. Rep. of Germany ....... 2921451

[51] Int. Cl.$^3$ .............................................. B60H 1/02
[52] U.S. Cl. .................................. 237/12.3 C; 62/48; 123/1 A; 123/DIG. 12; 123/142.5 R; 423/248; 423/648 R
[58] Field of Search ...................... 237/12.3 C, 12.3 R; 62/48; 123/1 A, DIG. 12, 142.5 R, 142.5 E; 432/248, 648 R; 165/DIG. 17, 104 S; 60/649

[56] References Cited

U.S. PATENT DOCUMENTS

| | | | |
|---|---|---|---|
| 3,504,494 | 4/1970 | Winsche | 60/649 |
| 4,198,827 | 4/1980 | Terry et al. | 60/649 |
| 4,214,699 | 7/1980 | Buchner et al. | 123/142.5 R |

Primary Examiner—Albert J. Makay
Assistant Examiner—Henry Bennett
Attorney, Agent, or Firm—Craig & Burns

[57] ABSTRACT

A method of preheating vehicles equipped with internal combustion engines involves the utilization of the heat released when hydrogen is combined with a high-temperature hydride-forming material contained within a high-temperature reservoir. The high-temperature reservoir contains a sufficient quantity of low-temperature reservoir hydride-forming material that when hydrogen is added from a low-temperature reservoir to the high-temperature reservoir, the quantity of heat which is initially released by the low-temperature hydride-forming material is sufficient to raise the high-temperature reservoir hydride-forming material also contained in the high-temperature reservoir to the reaction temperatures required for absorption of hydrogen and the release of heat. The amount of heat released in the high-temperature reservoir is used to preheat the vehicle by heat exchange with the vehicle passenger compartment and/or engine and the exhaust heat released by the engine during operation is used to desorb the hydrogen from the hydride-forming material in the high-temperature reservoir and transfer the hydrogen back to a low-temperature reservoir.

5 Claims, 1 Drawing Figure

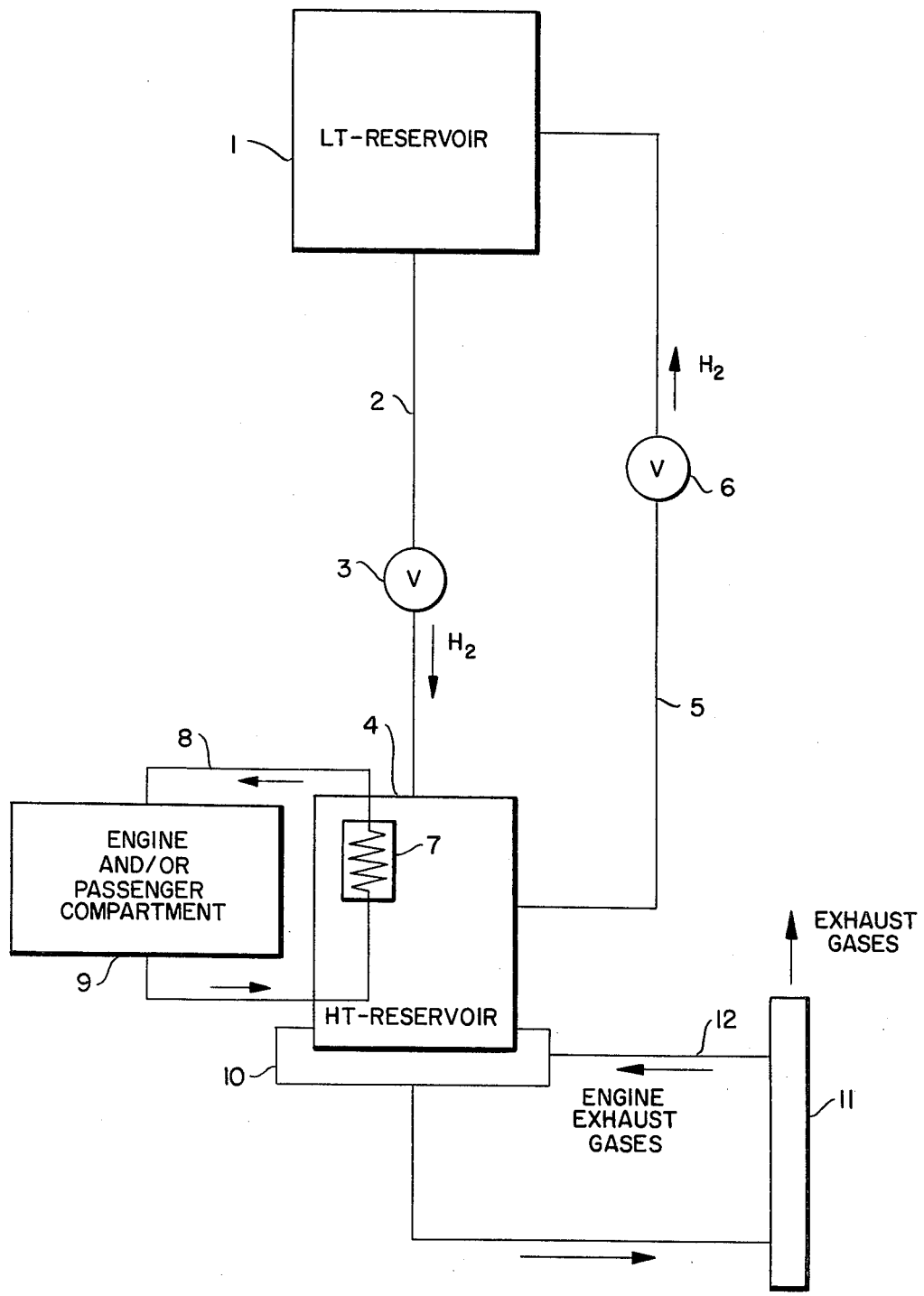

METHOD OF PREHEATING MOTOR VEHICLES WITH INTERNAL COMBUSTION ENGINES

A known disadvantage of conventional motor vehicles operated with liquid or liquefied fuels is that a certain period of time must elapse, after starting a cold engine, until the engine has reached its operating temperature and the passenger compartment can be heated sufficiently. This results in a considerable increase in fuel consumption and reduced passenger comfort during the warmup phase.

To eliminate these disadvantages, it has already been proposed to warm up the vehicle before starting the engine. In general, the passenger compartment is heated by a separate heating system, burning fuel in a burner (stationary heating). However, there have also been proposals for heating the engine or the passenger compartment by a heater using electrical current and employing a heating element or a blower. The disadvantages of these preheating methods include consumption of expensive fuel and/or electrical energy and, when electrical energy is used, the additional requirement to connect the vehicle to a power line during the preheating period, since the required amount of current is too great to be drawn from the vehicle battery.

In addition, German Offenlegungsschrift 2,715,990 teaches a method of stationary heating of motor vehicles equipped with hydride reservoirs, operated at least partially by hydrogen, wherein the heat generated by transferring hydrogen from a low-temperature hydride reservoir (LT-reservoir) to a high-temperature hydride reservoir (HT-reservoir) is used for heating the vehicle. However, on the one hand, this method is limited to hydrogen-powered vehicles, and on the other hand, it is not suitable for preheating motor vehicles, since hydrogen must first be drawn from the HT-reservoir by operating the vehicle before any heating effects can be produced by transfer. Over long operating distances, when the hydrogen tanks are nearly empty, it is likewise no longer possible to produce heat, since the hydrogen present in the LT-reservoir is required to start the engine, and the engine must be operated off the LT-reservoir until the HT-reservoir has been raised to operating temperature by the heat given off by the engine. Finally, heating is not possible when the engine or the HT-hydride reservoir are cold, since the hydrogen uptake of a cold HT-hydride reservoir is so sluggish that no heating effects are produced. Therefore, for stationary heating, the HT-reservoir must always have been raised to reaction temperature by previous operation.

Hence, the goal of the invention consists in providing a method of preheating motor vehicles with internal combustion engines, wherein no electricity or fuel is consumed, said method being usable in all motor vehicles with internal combustion engines and workable at any time.

This goal is achieved by the method of this invention.

In the method according to the invention, suitable for all vehicles with internal combustion engines, hydrogen is transferred from a low-temperature hydride reservoir (LT-reservoir) to a high-temperature hydride reservoir (HT-reservoir). The heat of combination which is released during the combination of the hydrogen to the hydride-forming material in the HT-reservoir, which is considerable, is utilized for heating purposes. The quantity of heat which is required to release the hydrogen from the LT-reservoir is drawn from its heat capacity or from the ambient air, since hydrogen can be released from LT-reservoirs even at very low temperatures. As soon as the engine of the motor vehicle begins operating, the heat given off in the exhaust gases, which remains at a high temperature level, serves to drive the hydrogen out of the HT-reservoir again and force it back into the LT-reservoir. Therefore, there is a closed hydrogen loop, in other words, no hydrogen is consumed, and the hydrogen is transported back and forth between the LT- and HT-reservoirs in a cyclic manner.

Since the high-temperature reservoir materials (i.e. the hydride-forming materials in the high-temperature reservoir which combine with hydrogen at a high temperature) in the cold state, in other words, depending on their composition, below a temperature of approximately 80°–200° C., have such a low uptake rate for hydrogen that practically no heating effect can be achieved, it is necessary to bring these materials up to the reaction temperature required for a smooth hydrogen uptake. This is accomplished by including the HT-reservoir a quantity of low-temperature reservoir materials (i.e. hydride-forming materials that combine well with hydrogen at a low temperature) such that the amount of heat created in the low-temperature reservoir materials during hydrogen uptake suffices to bring the high-temperature material in the high-temperature reservoir up to reaction temperature.

Of course, it is not possible to use the same low-temperature reservoir materials in the HT-reservoir as in the LT-reservoir, since this is not thermodynamically feasible. Therefore, reservoir materials are used in the LT-reservoir above which the hydrogen pressure at room temperature is at least 5 and preferably 10–20 bars higher than the hydrogen pressure above the LT-reservoir material in the HT-reservoir at the same temperature. The pressure differential must not be less than 5 bars, since the pressure is critical to rapid transfer of the hydrogen and, therefore, to the desired rapid generation of heat. With a small pressure differential, the rate at which heat is developed will be correspondingly less as well. However, the pressure differential must not be made too high, since the stresses on the material of which the container and lines are composed becomes higher with increasing hydrogen pressure and the method is made increasingly uneconomical by the increasing costs and the rising weight of the system. A pressure differential of 10–20 bars is especially suitable; for the reasons given above, the pressure differential should not be more than 50 bars. The selection of suitable bzw. temperature storage materials for the use in the HT- or LT-reservoir can be made easily according to their equilibrium pressures at room temperature, which can be determined without difficulty by experiment or taken from the physical data published in the literature. Suitable storage materials for the LT-reservoir are, for example, TiCrMn, (misch metal) $Ni_5$, $Ti_{0.9}Zr_{0.1}Cr_2$, and $Ti_{0.95}Zr_{0.05}CrMn$, which are alloys that have a hydrogen equilibrium pressure at room temperature that is approximately 10 to 50 bars. TiCrMn or modified TiCrMn alloys which have an equilibrium pressure of more than 5 bars at $-20°$ C. are especially suitable. Misch metal is a common expression for an unrefined rare earth alloy containing 60 to 60% Ce, 25 to 30% La, 15 to 18% Nd, 4 to 6% Pr and up to 2% of other rare earth metals.

The hydrogen released in the LT-reservoir is combined in the HT-reservoir, producing heat. High-temperature reservoir materials do have the advantage that when hydrogen is combined in them, a quantity of heat is released which is twice as great as that in the low-temperature reservoir materials, but these materials are so slow to react at room temperature or less that there is practically zero hydrogen uptake. High-temperature reservoir materials are generally known and have been described in detail, for example, in the *International Journal of Hydrogen Energy* since 1974, in the *Proceedings of the International Symposium on Hydrides for Energy Storage,* by J. J. Reilly, Gelo (Norway), August, 1977, and in the *Proceedings of the 2nd World Hydrogen Energy Conference,* Zurich, Switzerland, 1978, Editors: Veziroglu and Seifritz. $Mg_2Ni$, $Mg(Ni)$ (a phase mixture of Mg with $Mg_2Ni$ with a $Mg_2Ni$ content of 2 to 100 percent), $Ti_2Co$, $TiCo$, $TiNi$, and $CaNi_5$ are used especially frequently as the metal alloy high-temperature reservoir materials. The working temperature of these materials is between 150° and 350° C., wherein the "working temperature" is understood to be the temperature at which the hydrogen pressure above the high-temperature reservoir material is between 1 and 10 bars, thereby ensuring rapid hydrogen uptake, i.e. combination. The working temperature is simultaneously the temperature, which an uncharged reservoir assumes when hydrogen is supplied to it at the appropriate pressure.

According to the invention, the HT-reservoir and/or the high-temperature reservoir material are brought to working temperature in such fashion that the effects of the low-temperature reservoir material is mixed with the high-temperature reservoir material. The low-temperature reservoir material contained in the high-temperature reservoir absorbs hydrogen even in the cold state, warming as a result and thereby bringing the high-temperature reservoir material up to working temperature. In addition, it can also be advantageous to add several low-temperature reservoir materials that have staggered working temperatures, to the high-temperature reservoir material. Thus, for example, the first low-temperature reservoir material can heat the HT-reservoir from −20° to 90° C., at 90° C. the reaction jumps to the second low-temperature reservoir material, and this second material then heats up the HT-reservoir from 90° to 200° C., the temperature at which the HT-reservoir material becomes effective. Although the second low-temperature reservoir material already acts as a high-temperature reservoir material in this case, the "true" high-temperature reservoir material is not eliminated as a result, since a much greater amount of heat is released during the combination of hydrogen with high-temperature reservoir materials than in low-temperature reservoir materials, and, therefore, a much better heating can be achieved with a limited structural volume or weight or with a predetermined quantity of hydrogen. The low-temperature reservoir materials suitable for admixture to the HT-reservoir must act in such a way that the hydrogen pressure above them at room temperature is at least 5 bars below the hydrogen pressure above the LT-reservoir. This pressure differential is required in order to permit a sufficiently rapid hydrogen transport from the LT-reservoir to the HT-reservoir and consequently a rapid development of heat in the HT-reservoir.

Low temperature reservoir materials together with their properties are well known, and described in detail for example in the literature cited hereinabove. Suitable alloy materials include, for example, TiFe, $LaNi_5$, Ca (misch metal) $Ni_5$, which have a working temperature of approximately 0°–80° C., and TiNi, TiCo, and $Ti_2Co$ with a working temperature of 80°–200° C. The quantity of low-temperature reservoir materials to be added to the high-temperature reservoir material depends upon the quantity of heat which is released in the low-temperature reservoir materials during the uptake of hydrogen (enthalpy of formation for the hydride). The enthalpy of formation is generally described in the literature, but can also be easily determined experimentally. When we know the enthalpy of formation, the necessary quantities can be calculated without difficulty. The weight ratio of low-temperature reservoir materials to high-temperature reservoir materials should be in the range of 0.3 to 1.5. An HT-reservoir which contains 40–57 wt% TiCo is preferred.

The HT-reservoir and LT-reservoir are connected together by a hydrogen line which can be shut off with a valve. For heating, the hydrogen is allowed to flow from the hydrogen full LT-reservoir into the empty HT-reservoir. The resultant heat created in the HT-reservoir is then removed from the HT-reservoir by means of a heat exchanger and used to heat the cooling water of the engine or the passenger compartment. While the engine is operating, the HT-reservoir is heated by the exhaust gases. The hydrogen is split off once again from the HT-reservoir and compressed back into the LT-reservoir. Since the HT-reservoir is heated by the exhaust gases, which emerge from the engine at a temperature of up to 600° C., there are no problems involved in bringing the HT-reservoir to temperatures at which the hydrogen pressure above the HT-reservoir is higher than above the LT-reservoir in order to cause the hydrogen to be transported back into the LT-reservoir. The heat which is given off in the course of the hydrogen being returned for storage to the LT-reservoir can be given off to the ambient air, in the same fashion as the amount of heat which is required to release the hydrogen from the LT-reservoir can be drawn from the ambient air.

The advantages associated with the method according to the invention lie primarily in the fact that a large quantity of heat at a high temperature level can be made available in a short space of time with a relatively low apparatus weight, and that this quantity of heat need not be produced by burning of fuel or using electrical energy, but is obtained by utilizing the heat from the hot exhaust gases which would otherwise be discharged in the usual fashion uselessly into the atmosphere.

EXAMPLE 1

It is assumed that the following conditions exist for preheating:

| | |
|---|---|
| Ambient temperature | −20° C. |
| Heating power | 5 kW |
| Heating time | 10 min = 600 seconds |

The total quantity of energy to be transferred is 3000 kJ. The combination energy of Mg(Ni) with $H_2$ is −75 to −79 kJ/mole of $H_2$. Therefore, 40 moles of $H_2$, corresponding to 80 g of hydrogen, must be stored in the metal. The $H_2$ storage capacity of Mg (with 5 atomic percent Ni) is 7–7.4 wt% $H_2$, so that a mass of metal of 1150 g of Mg(Ni) is required to store 80 g of $H_2$. The storage capacity of the TiCrMn alloy is 1.9 wt% of $H_2$, and the active mass of TiCrMn totals 4211 g.

At −20° C., $TiCrMnH_{3-x}$ (0.1<x<3) has an $H_2$ dissociation pressure of 13 bars. In order to heat 1150 g of Mg(Ni) from −20° C. to the operating temperature of 270° C., the following energy is required:

$$\Delta Q + C_{pMg(Ni)} \times m_{Mg(Ni)} \times 290° C. = 363 \text{ kJ}$$

where $C_{pMG(Ni)} \approx 1.1$ J/g×degree.

This energy is produced by $H_2$ charging of Ti(Fe, Mn) and TiCo. In addition, the energy must be supplied to heat up the Ti(Fe, Mn) and TiCo. Ti(Fe, Mn) stands for a TiFe with a small amount of Mn, following the formula $TiFe_{1-x}Mn_x$ with x from 0 to 0.3.

Hydrogenation of Ti(Fe, Mn) heats the high-temperature reservoir from −20° C. to approximately 80° C., the reaction temperature of TiCo. Then the reservoir is heated further from 80° C. to 270° C. by hydrogenation of TiCo to the operating temperature for Mg(Ni).

1. $\Delta Q_{-20°\rightarrow 80°} = (C_{pMg(Ni)} \times m_{Mg(Ni)} + C_{pTi(Fe, Mn)} m_{Ti(Fe, Mn)} + C_{pTiCo} \times m_{TiCo}) \times 100°$
2. $\Delta Q_{80°\rightarrow 270°} = (C_{pMg(Ni)} \times m_{Mg(Ni)} + C_{pTi(Fe, Mn)} m_{Ti(Fe, Mn)} + C_{pTiCo} \times m_{TiCo}) \times 190°$ $\Delta Q_{total} = Q_{20°\rightarrow 80°} + Q_{80°\rightarrow 270°}$ The enthalpy of formation of Ti(Fe, Mn) $H_{2-x}$ (0.1<x<2) is −32 kJ/mole of $H_2$ and that of $TiCoH_{1.1-x}$ (0.1<x<1) is −52.3 kJ/mole of $H_2$. In order to heat the high-temperature reservoir from −20° C. to approximately 80° C., the following energy is required:

$$\Delta Q_{-20°\rightarrow 80°} = 222 \text{ kJ}.$$

In order to apply this energy, a total of 7 moles of $H_2$ or 14 g of $H_2$ must be embedded in TiFe. The $H_2$ storage capacity of Ti(Fe, Mn) is 1.9 wt% of $H_2$ based on the active material, so that the minimum TiFe quantity is 730 g.

In order to heat the high-temperature reservoir further from 80° C. to 270° C., the following energy is required:

$$\Delta Q_{80°\rightarrow 270°} = 422 \text{ kJ}.$$

To accomplish this, 8.1 moles of $H_2$ or 16.2 g of $H_2$ must be embedded in the TiCo. The $H_2$ storage capacity of TiCo at 80° C. is 1.3 wt% $H_2$, so that a minimum of 1240 g of TiCo must be present. Adding a safety factor, we find that the hydride components in the high-temperature reservoir (TiFe, TiCo, and Mg(Ni)) are:

750 g of TiFe, 1350 g of TiCo, and 1150 g of Mg(Ni).

The total weight of the high-temperature reservoir including the material of which the container is composed (30% of the active mass) is:

3250 g + 975 g = 4225 g.

In order to be able to transfer the quantity of $H_2$ stored by the high-temperature reservoir back into the low-temperature reservoir, the low-temperature reservoir must contain a total of 5800 g of TiCrMn. The low-temperature reservoir, including the storage container (20% of the active mass), weighs 6960 g.

Together with the lines and valves, the total weight is not in excess of 15 kg and is an efficient assembly from both the weight and volume standpoints.

Process by Which Heat is Released

With an ambient temperature of −20° C., the low-temperature hydride reservoir containing the 5800 g of TiCrMn is completely charged with hydrogen and the $H_2$ dissociation pressure above the hydride is equal to or greater than 13 bars. The high-temperature reservoir is empty of hydrogen and contains a mixture of 750 g of Ti(Fe,Mn), 1350 g TiCo, and 1150 g Mg(Ni). The $H_2$ dissociation pressure of $TiFeH_{2-x}$(0<x<2) at −20° C. is less than 1 bar, while that of TiCo hydride and Mg(Ni) hydride is less than $10^{-1}$ bar and $10^{-2}$ bar, respectively. When the valve between the two reservoirs is opened, the pressures are equalized and Ti(Fe, Mn) is charged with hydrogen, releasing heat, while TiCo and Mg(Ni) cannot be charged as a result of the low reaction kinetics. The Ti(Fe, Mn) hydride assumes the temperature corresponding to an $H_2$ equilibrium pressure of 13 bars (70° C.-80° C.) and gives off heat at this temperature level to the high-temperature reservoir material (TiFe, TiCo, and Mg(Ni)). Once the material has assumed a temperature of 70° C., the reaction of the hydrogen with TiCo is decisive for further heating of the material. The TiFe is fully charged, while the reaction of the hydrogen with Mg(Ni) begins only at temperatures above 200° C. at a higher reaction rate.

After the material reaches a temperature of 250° C. or more, the heat released by the reaction of Mg(Ni) with $H_2$ can be tapped off for preheating purposes. During the entire heating process, by appropriate heat exchange of the low-temperature hydride $TiCrMnH_{3-x}$ (0<x<3) with the ambient air, it must be ensured that the reservoir temperature does not drop significantly below −20° C., thus maintaining an $H_2$ liberation pressure of 13 bars.

After 250° C. is reached in the high-temperature reservoir, preheated compartment air with temperatures above −20° C. can be conducted through the low-temperature reservoir so that the $H_2$ release pressure can then be raised above 13 bars so that even higher exchange rates are possible between the low-temperature reservoir and the high-temperature reservoir.

After approximately 10 minutes, $H_2$ exchange is terminated. Now a total energy of about 500 kJ to 600 kJ can be used for preheating by cooling down the reservoir material.

The system is regenerated (recharged from the LT-reservoir composed of TiCrMn) when the high-temperature reservoir is heated up by employing the exhaust heat developed during all combustion processes, to temperatures of more then 350° C. ($H_2$ pressure above 10 bars) (exhaust gas energy). Then the preheating system is ready to use again.

EXAMPLE 2

The reservoir weight of the high-temperature reservoir can be significantly reduced if not all of the high-temperature reservoir material is heated, but only a part of the Mg(Ni) (about 10%) is preheated to reaction temperature (270° C.). The remaining high-temperature reservoir material is then preheated by Mg(Ni) hydride formation to the required temperature.

The following energy balance is then produced under the same conditions as in Example 1:

In order to heat up 10% of the 1150 g of Mg(Ni) from −20° C. to 270° C., a total energy of 36.3 kJ is required: ($C_{pMg(Ni)}$ 1.1 J/g×degrees).

If energy is produced by charging TiFe resp. Ti(Fe,Mn) and TiCo with hydrogen, 1.4 g of $H_2$ (73 g of TiFe) must be embedded in the TiFe and 1.62 g of $H_2$ (124 g of TiCo) must be embedded in the TiCo. A further energy of 327 kJ must be applied to heat the remaining 90% of the Mg(Ni). If heating is produced by Mg(Ni) hydride formation, 8.7 g of $H_2$ must be embedded in 116.2 g of Mg(Ni). The high-temperature reservoir will then contain a total of:

1267 g Mg(Ni), 125 g TiCo, and 75 g TiFe.

Therefore, the total weight including the containers is 1467 g. In order to be able to transfer the hydrogen contained in the high-temperature reservoir back again, the low-temperature reservoir must contain 5445 g TiCrMn. Then such a low-temperature reservoir would weigh 6534 g including the container. In this case, the total system would have a total weight of above 11 kg.

Another possibility for weight savings consists in partially heating the reservoir material by using electric current from the vehicle battery. This consumes approximately 1 ampere hour of electrical charging capacity. This is a value which does not pose an excessive load on the type of vehicle batteries which are conventionally used today.

The single figure of accompanying drawings illustrates schematically an arrangement of apparatus for carrying out the method of preheating motor vehicles in accordance with the present invention. A hydrogen-full low-temperature hydride reservoir 1 is connected via conduit 2 and valve 3 to a hydrogen-empty high-temperature hydride reservoir 4 which contains a sufficient quantity of low-temperature reservoir hydride-forming materials to raise the high-temperature reservoir hydride-forming material in this reservoir to the reaction temperature which is required for absorption of hydrogen and the generation of heat. When the valve 3 is opened, hydrogen gas passes into the HT-reservoir and causes the generation of heat.

Another conduit 5 and valve 6 are connected to the high-temperature reservoir and the low-temperature reservoir to allow the return of hydrogen gas to the low-temperature reservoir upon completion of the preheat function.

A heat exchanger 7 is located in the high-temperature reservoir and is operatively associated, via conduit 8, with the internal combustion engine or the passenger compartment of the vehicle (generally designated by reference numeral 9) so that during the preheating operation one or more of these parts of the vehicle may be heated by the heat generated in the high-temperature reservoir.

The high temperature reservoir is also provided with a heat exchange jacket 10 through which engine exhaust gases can pass from the exhaust system 11 via conduit 12 to heat the high-temperature reservoir.

Once the temperature of the high-temperature reservoir has reached a level where the pressure of the high pressure above the high-temperature hydride-forming material is higher than the hydrogen pressure above the low temperature hydride-forming material in the low-temperature reservoir and the preheating function has been completed, valve 6 will be opened to allow the hydrogen in the high-temperature reservoir to return back into the low-temperature reservoir so that the apparatus will be ready for another preheat cycle.

It will be understood that there are many variations in the specific arrangement of the apparatus which may be used to carry out the method of the present invention. For example, it is possible to cause the hydrogen in the high-temperature reservoir to return to the low-temperature reservoir via the same valved conduit, such as conduit 2 and valve 3, without the provision of an additional return conduit and valve arrangement as shown.

We claim:

1. A method of preheating vehicles with internal combustion engines without consuming heating material by employing the heat which is given off when hydrogen is transferred from a low-temperature hydride reservoir to a high-temperature hydride reservoir, characterized in that the high-temperature reservoir is initially at a temperature below the reaction temperature which is required for absorption of hydrogen by the high-temperature reservoir hydride-forming material contained therein, the low-temperature reservoir is placed in communication with the high-temperature reservoir to allow the introduction of hydrogen from the low-temperature reservoir into the high-temperature reservoir, the high-temperature reservoir contains in addition to the high-temperature reservoir hydride-forming material contained therein, a sufficient quantity of low-temperature reservoir hydride-forming material that when the hydrogen is introduced from the low-temperature reservoir to the high-temperature reservoir, the quantity of heat which is initially released in the low-temperature reservoir hydride forming material in the high-temperature reservoir is sufficient to raise the high-temperature reservoir hydride forming material to the reaction temperature which is required for the absorption of hydrogen, the low-temperature reservoir contains a reservoir hydride-forming material above which the hydrogen pressure at room temperature is at least 5 bars higher than the hydrogen pressure above the low-temperature reservoir material in the high-temperature reservoir at the same temperature, the amount of heat further released in the high-temperature reservoir is used to preheat the vehicle by heat exchange with the vehicle passenger compartment and/or the engine, and the exhaust heat released by the engine during operation is used to desorb the hydrogen from the hydride-forming material in the high-temperature reservoir and to transfer the hydrogen back to the low-temperature reservoir.

2. A method according to claim 1, characterized in that the low-temperature reservoir contains TiCrMn and the high-temperature reservoir contains 50 to 57 wt% of $Mg_2Ni$ and/or MgNi, 35 to 13 wt% TiFe, and 42 to 30 wt% TiCo.

3. A method according to claim 1 or claim 2, characterized in that the hydrogen pressure at room temperature above the material in the low-temperature reservoir is 10 to 20 bars higher than the hydrogen pressure above the material in the high-temperature reservoir at the same temperature.

4. A method according to claim 1, characterized in that the hydrogen is initially introduced into the high-temperature reservoir from the low-temperature reservoir via a conduit provided with a valve for placing said reservoirs in communication with each other.

5. A method according to claim 1, characterized in that the weight ratio of low-temperature reservoir hydride-forming material to the high-temperature reservoir hydride-forming material in said high-temperature reservoir is in the range of 0.3 to 1.5.

* * * * *